United States Patent
Du

(10) Patent No.: US 10,338,218 B2
(45) Date of Patent: Jul. 2, 2019

(54) METHOD AND APPARATUS FOR OBTAINING VIBRATION INFORMATION AND USER EQUIPMENT

(71) Applicant: BEIJING ZHIGU RUI TUO TECH CO., LTD., Beijing (CN)

(72) Inventor: Lin Du, Beijing (CN)

(73) Assignee: Beijing Zhigu Rui Tuo Tech Co., Ltd., Beijing (CN)

( * ) Notice: Subject to any disclaimer, the term of this patent is extended or adjusted under 35 U.S.C. 154(b) by 244 days.

(21) Appl. No.: 15/526,239

(22) PCT Filed: Oct. 10, 2015

(86) PCT No.: PCT/CN2015/091651
§ 371 (c)(1),
(2) Date: May 11, 2017

(87) PCT Pub. No.: WO2016/078486
PCT Pub. Date: May 26, 2016

(65) Prior Publication Data
US 2017/0322306 A1 Nov. 9, 2017

(30) Foreign Application Priority Data
Nov. 17, 2014 (CN) .......................... 2014 1 0654093

(51) Int. Cl.
*G01H 9/00* (2006.01)
*G01S 15/06* (2006.01)
(Continued)

(52) U.S. Cl.
CPC ............... *G01S 15/42* (2013.01); *G01H 9/00* (2013.01); *G01S 15/06* (2013.01); *H04R 1/34* (2013.01); *H04R 3/005* (2013.01)

(58) Field of Classification Search
CPC .......... G01S 15/06; G01S 15/42; G01S 15/46; G01H 9/00; G01H 3/12; G01H 3/125; G01H 1/00; H04R 1/34; H04R 3/005
(Continued)

(56) References Cited

U.S. PATENT DOCUMENTS 5,748,561 A     5/1998  Hotta
6,721,429 B1 *  4/2004  Akamatsu ............. H04R 19/04
                                                        381/111
(Continued)

FOREIGN PATENT DOCUMENTS

CN          1748129         3/2006
CN        102141430         8/2011
(Continued)

OTHER PUBLICATIONS

International Search Report and Written Opinion for Application No. PCT/CN2015/091651, dated Jan. 12, 2016, 9 pages.
(Continued)

*Primary Examiner* — Xu Mei
(74) *Attorney, Agent, or Firm* — Sheppard Mullin Richter & Hampton LLP

(57) ABSTRACT

Embodiments of the present application disclose a method and an apparatus for obtaining vibration information and user equipment. The method comprises: obtaining at least one group of reflected electromagnetic wave signals, wherein the at least one group of reflected electromagnetic wave signals are formed by reflecting an electromagnetic wave signal by at least one electromagnetic wave reflective array when the at least one electromagnetic wave reflective array vibrates in response to a sound in an environment; each electromagnetic wave reflective array comprises multiple first reflective units with different electromagnetic wave reflective characteristics; analyzing the at least one group of
(Continued)

reflected electromagnetic wave signals to obtain at least one set of vibration information corresponding to the at least one electromagnetic wave reflective array; and obtaining, according to the at least one set of vibration information, at least one piece of vibration source direction information corresponding to at least one location of the at least one electromagnetic wave reflective array. In technical solutions of the embodiments of the present application, obtaining sound information in an environment by using a wireless electromagnetic wave is especially applicable to some scenarios where an active component is not suitable for use at a sound collecting location and a scenario where sound information at multiple locations needs to be collected in a space.

26 Claims, 9 Drawing Sheets

(51) Int. Cl.
    *G01S 15/42*     (2006.01)
    *H04R 1/34*     (2006.01)
    *H04R 3/00*     (2006.01)

(58) Field of Classification Search
    USPC ....... 381/91, 92, 122, 111–115, 160; 73/655,
                               73/627, 628, 570, 587, 645–648
    See application file for complete search history.

(56) References Cited

U.S. PATENT DOCUMENTS

| | | | |
|---|---|---|---|
| 7,373,823 B2 | 5/2008 | Bosselmann et al. | |
| 7,397,421 B2 | 7/2008 | Smith | |
| 7,477,571 B2* | 1/2009 | Melese | A61B 5/11 367/7 |
| 8,982,669 B2 | 3/2015 | Barthel et al. | |
| 9,992,580 B2* | 6/2018 | Cohen | H04N 7/147 |
| 10,197,437 B2* | 2/2019 | Du | G01H 3/125 |
| 2005/0265124 A1 | 12/2005 | Smith | |
| 2007/0028695 A1* | 2/2007 | Suzuki | G01H 9/00 73/655 |
| 2011/0175766 A1 | 7/2011 | Peczalski et al. | |
| 2015/0177195 A1* | 6/2015 | Sasaki | G01N 29/12 73/579 |
| 2017/0314988 A1* | 11/2017 | Du | G01H 11/06 |
| 2017/0356792 A1* | 12/2017 | Wakita | G01H 9/00 |
| 2018/0011006 A1* | 1/2018 | Kingscott | G01N 21/1702 |
| 2019/0018165 A1* | 1/2019 | McManamon | E21B 47/0003 |

FOREIGN PATENT DOCUMENTS

| | | |
|---|---|---|
| CN | 102299753 | 12/2011 |
| CN | 102713667 | 10/2012 |
| CN | 104360308 | 2/2015 |
| CN | 104360309 | 2/2015 |
| CN | 104374462 | 2/2015 |
| CN | 104374463 | 2/2015 |
| CN | 104374464 | 2/2015 |
| CN | 104502892 | 4/2015 |
| CN | 104502893 | 4/2015 |
| DE | 19728653 | 1/1999 |
| JP | 3894887 | 3/2007 |
| NL | 1038090 | 1/2012 |
| RU | 2025669 | 12/1994 |
| SU | 1753296 | 8/1992 |
| WO | 01/14825 | 3/2001 |

OTHER PUBLICATIONS

Liu et al., "Ambient Backscatter: Wireless Communication Out of Thin Air," SIGCOMM, Aug. 2013, p. 27-38.

Pu et al., "Whole-Home Gesture Recognition Using Wireless Signals," In Proceedings of the 19$^{th}$ Annual International Conference on Mobile Computing & Networking (MobiCom '13), ACM, 2013, p. 27-38.

Wang et al., "We Can Hear You with Wi-Fi!," in Proceedings of the 20$^{th}$ Annual International Conference on Mobile Computing and Networking (MobiCom '14), ACM, 2014, p. 593-604.

\* cited by examiner

METHOD AND APPARATUS FOR OBTAINING VIBRATION INFORMATION AND USER EQUIPMENT

CROSS-REFERENCE TO RELATED APPLICATIONS

This application is a National Phase Application of International Application No. PCT/CN2015/091651, filed on Oct. 10, 2015, which claims the benefit of priority to Chinese Patent Application No. 201410654093.X, filed on Nov. 17, 2014, and entitled "Method and Apparatus for Obtaining Vibration Information and User Equipment", each of which is incorporated into the present application by reference herein in its entirety.

TECHNICAL FIELD

The present application relates to a sound detection technology, and in particular, to a method and an apparatus for obtaining vibration information, and user equipment.

BACKGROUND

In some video recording, audio recording, and monitoring scenarios, sound information in an environment needs to be collected. For example, a microphone may be used to perform sound information collection. The microphone usually converts, by a diaphragm, a sound vibration in the air to a vibration of the diaphragm, and then to a change of a current signal by a transducer.

SUMMARY

A possible objective of embodiments of the present application is to provide a sound detection solution.

In a first aspect, a possible implementation solution of the present application provides a method for obtaining vibration information, comprising:

obtaining at least one group of reflected electromagnetic wave signals, wherein the at least one group of reflected electromagnetic wave signals are formed by reflecting an electromagnetic wave signal by at least one electromagnetic wave reflective array when the at least one electromagnetic wave reflective array vibrates in response to a sound in an environment, and each electromagnetic wave reflective array in the at least one electromagnetic wave reflective array comprises multiple first reflective units with different electromagnetic wave reflective characteristics;

analyzing the at least one group of reflected electromagnetic wave signals to obtain at least one set of vibration information corresponding to the at least one electromagnetic wave reflective array; and obtaining, according to the at least one set of vibration information, at least one piece of vibration source direction information corresponding to at least one location of the at least one electromagnetic wave reflective array.

In a second aspect, a possible implementation solution of the present application provides an apparatus for obtaining vibration information, comprising:

a reflected signal obtaining module, configured to obtain at least one group of reflected electromagnetic wave signals, wherein the at least one group of reflected electromagnetic wave signals are formed by reflecting an electromagnetic wave signal by at least one electromagnetic wave reflective array when the at least one electromagnetic wave reflective array vibrates in response to a sound in an environment, and each electromagnetic wave reflective array in the at least one electromagnetic wave reflective array comprises multiple first reflective units with different electromagnetic wave reflective characteristics; and an analyzing and processing module, comprising:

a vibration information obtaining unit, configured to analyze the at least one group of reflected electromagnetic wave signals to obtain at least one set of vibration information corresponding to the at least one electromagnetic wave reflective array; and a vibration direction obtaining unit, configured to obtain, according to the at least one set of vibration information, at least one piece of vibration source direction information corresponding to at least one location of the at least one electromagnetic wave reflective array.

In a third aspect, a possible implementation solution of the present application provides user equipment, comprising the foregoing apparatus for obtaining vibration information.

In a fourth aspect, a possible implementation solution of the present application provides a computer readable storage device comprising executable instructions that, in response to execution, cause a device comprising a processor to perform operations, comprising:

obtaining at least one group of reflected electromagnetic wave signals, wherein the at least one group of reflected electromagnetic wave signals are formed by reflecting an electromagnetic wave signal by at least one electromagnetic wave reflective array when the at least one electromagnetic wave reflective array vibrates in response to a sound in an environment; and each electromagnetic wave reflective array in the at least one electromagnetic wave reflective array comprises multiple first reflective units with different electromagnetic wave reflective characteristics;

analyzing the at least one group of reflected electromagnetic wave signals to obtain at least one set of vibration information corresponding to the at least one electromagnetic wave reflective array; and obtaining, according to the at least one set of vibration information, at least one piece of vibration source direction information corresponding to at least one location of the at least one electromagnetic wave reflective array.

In at least one implementation solution of the embodiments of the present application, by obtaining and analyzing the reflected electromagnetic wave signal, the vibration information and the vibration source direction information of the sound at the electromagnetic wave reflective array in the environment can be restored, that is, sound information in an environment can be obtained by using a wireless electromagnetic wave, which is especially applicable to some scenarios where an active component is not suitable for use at a sound collecting location and some scenarios where sound information at multiple locations needs to be collected in a space.

DETAILED DESCRIPTION

Figure 1:
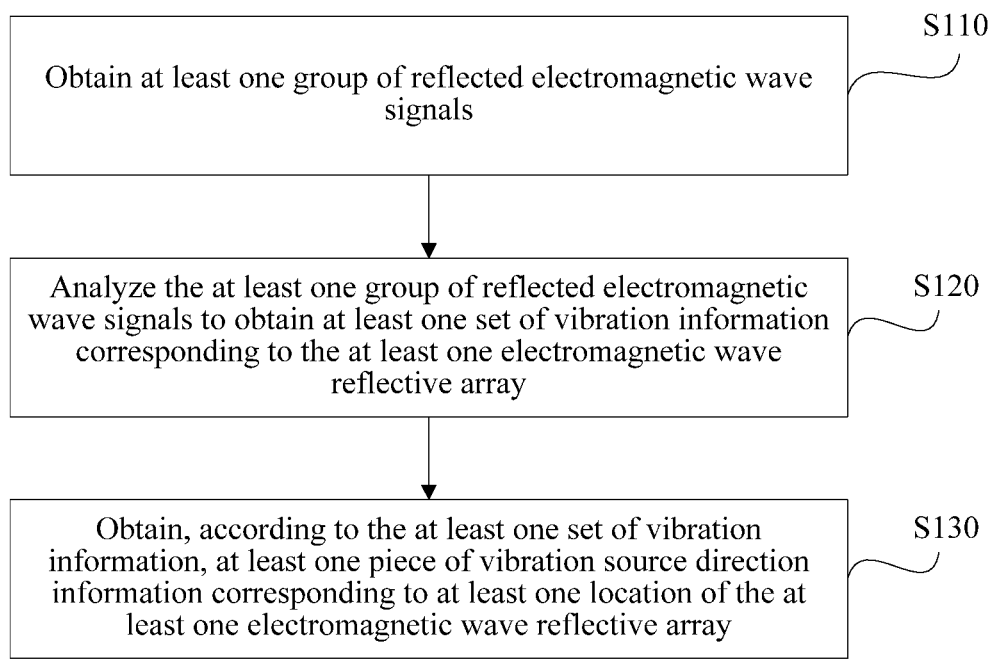
FIG. 1 is a schematic flowchart of a method for obtaining vibration information, according to an embodiment of the present application.

Specific implementations of the present application are further described in detail below with reference to the accompanying drawings (in which like elements are denoted by like reference numerals) and embodiments. The following embodiments are intended to describe the present application, but not to limit the scope of the present application.

A person skilled in the art may understand that the terms in the present application such as "first", "second", and the like are only used to differentiate different steps, devices, or modules, and the like, and represent neither any specific technical meaning nor a certain logic sequence between them.

In the following description of the embodiments of the present application, the "sound" is not limited to the sound within the human hearing range, and any sound that may cause the electromagnetic wave reflective array to vibrate may be comprised in the protection scope of the present application.

As shown in FIG. 1, an embodiment of the present application provides a method for obtaining vibration information, comprising:

S110: obtain at least one group of reflected electromagnetic wave signals, wherein the at least one group of reflected electromagnetic wave signals are formed by reflecting an electromagnetic wave signal by at least one electromagnetic wave reflective array when the at least one electromagnetic wave reflective array vibrates in response to a sound in an environment; and each electromagnetic wave reflective array in the at least one electromagnetic wave reflective array comprises multiple first reflective units with different electromagnetic wave reflective characteristics;

S120: analyze the at least one group of reflected electromagnetic wave signals to obtain at least one set of vibration information corresponding to the at least one electromagnetic wave reflective array; and S130: obtain, according to the at least one set of vibration information, at least one piece of vibration source direction information corresponding to at least one location of the at least one electromagnetic wave reflective array.

For example, as an entity for executing the embodiment, an apparatus for obtaining vibration information provided in the present application executes S110 to S130. Specifically, the apparatus for obtaining vibration information may be set in user equipment by means of software, hardware, or a combination of software and hardware, or the apparatus for obtaining vibration information itself is the user equipment; and the user equipment comprises, but is not limited to, a smart phone, a computer, a tablet, a home gateway, and the like.

In the implementation, the at least one group of reflected electromagnetic wave signals, the at least one electromagnetic wave reflective array, the at least one set of vibration information, and the at least one piece of vibration source direction information are in one-to-one correspondence respectively. For example, when the "at least one" indicates two:

the at least one group of reflected electromagnetic wave signals comprise a first group of reflected electromagnetic wave signals and a second group of reflected electromagnetic wave signals;

the at least one electromagnetic wave reflective array comprises: a first electromagnetic wave reflective array and a second electromagnetic wave reflective array;

the at least one set of vibration information comprises: a first set of vibration information and a second set of vibration information;

the at least one piece of vibration source direction information comprises: a first vibration source direction information and a second vibration source direction information;

wherein the first group of reflected electromagnetic wave signals are correspondingly formed by using the first electromagnetic wave reflective array, the first set of vibration information is obtained according to the first group of reflected electromagnetic wave signals, and the first vibration source direction information may be obtained according to the first set of vibration information; and the second group of reflected electromagnetic wave signals are correspondingly formed by using the second electromagnetic wave reflective array, the second set of vibration information is obtained according to the second group of reflected electromagnetic wave signals, and the second vibration source direction information may be obtained according to the second set of vibration information.

In a possible implementation, each group of reflected electromagnetic wave signals in the at least one group of reflected electromagnetic wave signals comprise multiple first reflected electromagnetic wave sub-signals corresponding to the multiple first reflective units of a corresponding electromagnetic wave reflective array in the at least one electromagnetic wave reflective array.

In the implementation, each set of vibration information in the at least one set of vibration information comprises: multiple pieces of first sub vibration information respectively corresponding to the multiple first reflective units of the corresponding electromagnetic wave reflective array.

In the implementation, for example, the step S120 may comprise:

analyzing the multiple first reflected electromagnetic wave sub-signals comprised in each group of reflected electromagnetic wave signals to obtain the multiple pieces of first sub vibration information corresponding to the multiple first reflective units of the corresponding electromagnetic wave reflective array.

In the implementation, for example, the step S130 may comprise:

obtain, according to amplitudes and phases of the multiple pieces of first sub vibration information comprised in each set of vibration information, a piece of vibration source direction information of the at least one piece of vibration source direction information corresponding to a location of the corresponding electromagnetic wave reflective array.

In a possible implementation, taking obtaining a group of reflected electromagnetic wave signals for example:

obtaining the group of reflected electromagnetic wave signals, wherein the group of reflected electromagnetic wave signals comprise multiple first reflected electromagnetic wave sub-signals corresponding to multiple first reflective units of an electromagnetic wave reflective array;

analyzing the multiple first reflected electromagnetic wave sub-signals to obtain multiple first sub vibration information correspond to the multiple first reflective units respectively due to different electromagnetic wave reflective characteristics of the multiple first reflective units; and wherein because relative locations between the multiple first reflective units in the electromagnetic wave reflective array are known, and according to a method for calculating an angle of arrival (for example, by using an algorithm such as a MUSIC algorithm or an ESPRIT algorithm), angles of arrival of the multiple pieces of first sub vibration information are obtained by using the amplitudes and phases of the multiple pieces of first sub vibration information, and then the vibration source direction information of a corresponding vibration at the electromagnetic wave reflective array can be obtained.

It can be seen from the foregoing description that, by using the foregoing implementation in the embodiment of the present application, the vibration information and the vibration source direction information of the sound at the at least one electromagnetic wave reflective array in the environment can be restored, that is, sound information in an environment can be obtained by using a wireless electromagnetic wave, which is especially applicable to some scenarios where an active component is not suitable for use at a sound collecting location and some scenarios where sound information at multiple locations needs to be collected in a space.

Steps of the embodiment of the application are further described by using the following implementations.

In a possible implementation, the method further comprises:

forming, when the at least one electromagnetic wave reflective array vibrates in response to the sound in the environment, the at least one group of reflected electromagnetic wave signals by reflecting the electromagnetic wave signal by the at least one electromagnetic wave reflective array.

In the implementation of the present application, in one aspect, the multiple first reflective units in the electromagnetic wave reflective array can vibrate in response to the sound in the environment, and in another aspect, the multiple first reflective units in the electromagnetic wave reflective array can reflect the electromagnetic wave signal. An electromagnetic wave reflective surface of each first reflective unit in the electromagnetic wave reflective array can reflect the electromagnetic wave signal while vibrating, and because the sound causes a mechanical vibration of the electromagnetic wave reflective surface, according to the Doppler's principle, the vibration changes a spectrum characteristic of the reflected electromagnetic wave signal, so that a signal with a frequency modulation characteristic is formed.

In a possible implementation, in an application scenario where sounds need to be collected, the electromagnetic wave reflective array can be set at a location where sounds need to be collected to reflect the electromagnetic wave signal.

In a possible implementation, the electromagnetic wave reflective array can be an electromagnetic wave reflective film array comprising multiple electromagnetic wave reflective films, that is, each electromagnetic wave reflective film is a reflective unit of the electromagnetic wave reflective array (the reflective unit can be the first reflective unit or the second reflective unit described below).

In a possible implementation, in order to obtain corresponding different electromagnetic wave reflective characteristics, printed antennas with different patterns can also be disposed on the multiple electromagnetic wave reflective films.

In a possible implementation, the electromagnetic wave reflective film can be a metallic film for example. In other possible implementations, the electromagnetic wave reflective film can be a film of another material, and the printed antenna is disposed on the reflective surface.

In a possible implementation, the reflecting comprises directional reflecting. That is, directional reflecting the reflected electromagnetic wave signal to a location where a receiving end of the at least one group of reflected electromagnetic wave signals is located.

In a possible implementation, the directional reflecting can be implemented by using a shape of the electromagnetic wave reflective array. For example, in a possible implementation, the reflective unit is an electromagnetic wave reflective film with a reflective surface having a curved surface, and the receiving end of the at least one group of reflected electromagnetic wave signals is located at a reflection convergence region of the curved surface. In a possible implementation, the curved surface can be a paraboloidal or ellipsoidal surface.

In a possible implementation, the electromagnetic wave signal comprises an environmental electromagnetic wave signal such as a radio wave, an optical signal, and the like in an environment. That is, in the implementation, there is no need to emit other electromagnetic wave signal for reflecting, and the reflected electromagnetic wave signal is formed by reflecting the existing environmental electromagnetic wave signal in the environment. A person skilled in the art can see that, in the implementation, existing electromagnetic field information in the space can be reused and there is no need to emit an electromagnetic signal.

In another possible implementation, the electromagnetic wave signal comprises a modulated electromagnetic wave signal modulated by an orbital angular momentum. A person skilled in the art may know that, after a reflection, the angular momentum of the modulated electromagnetic wave signal changes, so the at least one group of reflected electromagnetic wave signals comprise an electromagnetic wave component conjugated with the angular momentum of the modulated electromagnetic wave signal. In some implementations, a receiving end of the at least one group of reflected electromagnetic wave signals receives not only the at least one group of reflected electromagnetic wave signals but also the environmental electromagnetic wave signal and some source electromagnetic wave signals emit by an emitting end of the modulated electromagnetic wave signal, and by using a characteristic of the modulated electromagnetic wave signal (after a reflection, the angular momentum of the modulated electromagnetic wave signal changes), only the at least one group of reflected electromagnetic wave signals conjugated with the modulated electromagnetic wave signal are obtained, so that interference brought by the source signals of the emitting end is avoided.

S110: Obtain the at least one group of reflected electromagnetic wave signals.

In a possible implementation, for example, the at least one group of reflected electromagnetic wave signals can be received by the receiving end of the at least one group of reflected electromagnetic wave signals described above.

In another possible implementation, the at least one group of reflected electromagnetic wave signals can be obtained from an external device (for example, the receiving end described above) by using a communications module.

S120: Analyze the at least one group of reflected electromagnetic wave signals to obtain at least one set of vibration information corresponding to the at least one group of reflected electromagnetic wave signals.

In a possible implementation, by using a change of spectrum distribution of the at least one group of reflected electromagnetic wave signals, the at least one set of vibration information one-to-one corresponding to the at least one electromagnetic wave reflective array can be restored by utilizing a classic frequency modulation and demodulation method or a machine learning method.

A person skilled in the art may know that, sound information at a location where the at least one electromagnetic wave reflective array is located can be restored according to the at least one set of vibration information.

In a possible implementation, the receiving end can receive multiple groups of reflected electromagnetic wave signals reflected by multiple electromagnetic wave reflective arrays. In order to distinguish the multiple groups of reflected electromagnetic wave signals, electromagnetic wave reflective characteristics of the multiple electromagnetic wave reflective arrays are different. For example, the different electromagnetic wave reflective characteristics can be obtained by using the patterns of the printed antenna described above.

Here, after the multiple groups of reflected electromagnetic wave signals are obtained, the electromagnetic wave reflective arrays respectively corresponding to the multiple groups of reflected electromagnetic wave signals can be determined according to spectrum locations of the multiple groups of reflected electromagnetic wave signals and the electromagnetic wave reflective characteristics respectively corresponding to the multiple electromagnetic wave reflective arrays, so that a set of vibration information of locations where each electromagnetic wave reflective array is located can be obtained.

In a possible implementation, the multiple electromagnetic wave reflective arrays correspond to multiple different locations, at this time, in the implementation, the step S120 comprises:

analyzing the multiple groups of reflected electromagnetic wave signals to obtain multiple sets of vibration information corresponding to the multiple locations.

A person skilled in the art may see that, by using the foregoing implementation of the embodiment of the present application, a receiving end can be used to obtain the multiple sets of vibration information respectively corresponding to the multiple locations, and then sounds at the multiple locations are restored.

By comparing the foregoing implementation and a traditional implementation such as collecting sounds at multiple locations using multiple microphones, after the multiple electromagnetic wave reflective arrays are separately set at multiple locations where sounds need to be collected, only one receiving end is required to obtain the vibration information of the different locations respectively.

It is difficult for an individual electromagnetic wave reflective film to have vibration responses to sounds within a wide frequency range, so in a possible implementation, each electromagnetic wave reflective array in the at least one electromagnetic wave reflective array comprises multiple second reflective units with different vibration response characteristics. The following describes the implementation by using an example of which the at least one electromagnetic wave reflective array is an electromagnetic wave reflective array.

Each group of reflected electromagnetic wave signals in the at least one group of reflected electromagnetic wave signals comprise multiple second reflected electromagnetic wave sub-signals corresponding to the multiple second reflective units of a corresponding electromagnetic wave reflective array in the at least one electromagnetic wave reflective array.

In the implementation, the electromagnetic wave reflective array comprises multiple second reflective units with different vibration response characteristics, and each second reflective unit reflects a corresponding second reflected electromagnetic wave sub-signal to the receiving end, and the multiple second reflected electromagnetic wave sub-signals respectively reflected by the multiple second reflective units constitute a part of a group of reflected electromagnetic wave signals, that is, the group of reflected electromagnetic wave signals comprise the multiple first reflected electromagnetic wave sub-signals reflected by the multiple first reflective units in the electromagnetic wave array and the multiple second reflected electromagnetic wave sub-signals.

In a possible implementation, for example, the multiple second reflective units can vibrate in response to sounds within different frequency ranges respectively, that is, each second reflective unit vibrates in a sound frequency range.

In the implementation, the step S120 can comprise:

analyzing the group of reflected electromagnetic wave signals to obtain multiple pieces of first sub vibration information one-to-one corresponding to the multiple first reflected electromagnetic wave sub-signals and multiple pieces of second sub vibration information one-to-one corresponding to the multiple second reflected electromagnetic wave sub-signals. At this time, a set of vibration information corresponding to the electromagnetic wave reflective array comprises the multiple pieces of first sub vibration information and the multiple pieces of second sub vibration information.

For example, when the multiple second reflective units respectively correspond to sounds within multiple different spectrum ranges, the multiple pieces of second sub vibration information respectively correspond to components within different frequency ranges of the sound in the environment.

In a possible implementation, the step S120 can further comprise: synthesize the multiple pieces of second sub vibration information comprised in each set of vibration information to obtain synthesized vibration information of the sound located at each electromagnetic wave reflective array.

A person skilled in the art can know that, by using the implementation, the sound in the environment can be restored more completely in a wider frequency range, which results in better effect of the restored sound.

A person skilled in the art can understand that, in the foregoing methods of the specific implementations of the present application, the value of the serial number of each step does not mean an execution sequence, and the execution sequence of each step should be determined according to the function and internal logic thereof, and should not be any limitation to the implementation procedure of the specific implementations of the present application.

Figure 2:
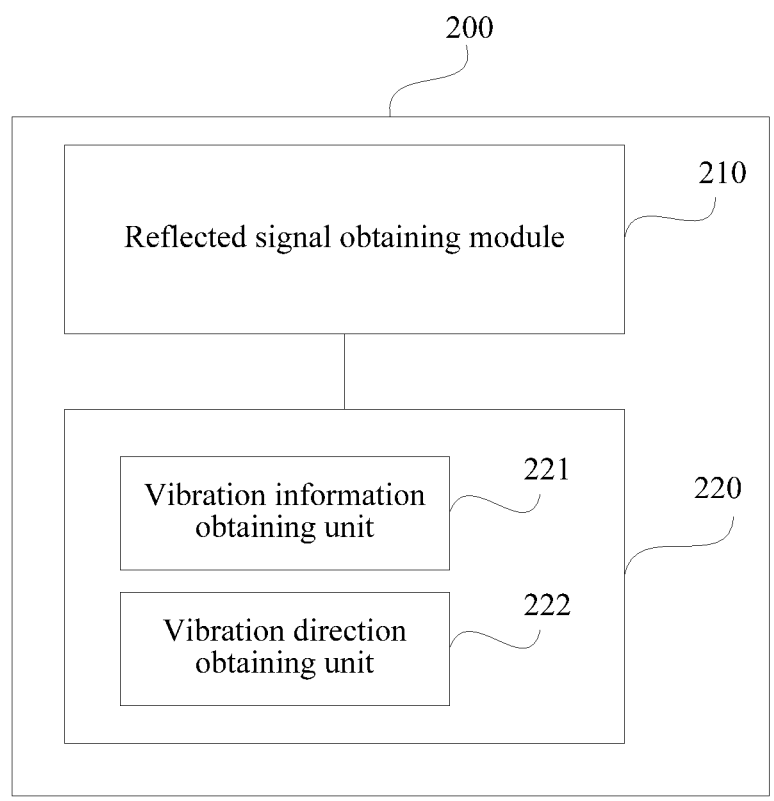
FIG. 2 is a schematic structural block diagram of an apparatus for obtaining vibration information, according to an embodiment of the present application.

As shown in FIG. 2, an embodiment of the present application provides an apparatus 200 for obtaining vibration information, comprising:

a reflected signal obtaining module 210, configured to obtain at least one group of reflected electromagnetic wave signals, wherein the at least one group of reflected electromagnetic wave signals are formed by reflecting an electromagnetic wave signal by at least one electromagnetic wave reflective array when the at least one electromagnetic wave reflective array vibrates in response to a sound in an environment; and each electromagnetic wave reflective array in the at least one electromagnetic wave reflective array comprises multiple first reflective units with different electromagnetic wave reflective characteristics; and an analyzing and processing module 220, comprising:

a vibration information obtaining unit 221, configured to analyze the at least one group of reflected electromagnetic wave signals to obtain at least one set of vibration information corresponding to the at least one electromagnetic wave reflective array; and a vibration direction obtaining unit 222, configured to obtain, according to the at least one set of vibration information, at least one piece of vibration source direction information corresponding to at least one location of the at least one electromagnetic wave reflective array.

In the implementation, the at least one group of reflected electromagnetic wave signals, the at least one electromagnetic wave reflective array, the at least one set of vibration information, and the at least one piece of vibration source direction information are in one-to-one correspondence respectively. For details, refer to the corresponding description in the embodiment shown in FIG. 1.

In a possible implementation, each group of reflected electromagnetic wave signals in the at least one group of reflected electromagnetic wave signals comprise multiple first reflected electromagnetic wave sub-signals corresponding to the multiple first reflective units of a corresponding electromagnetic wave reflective array in the at least one electromagnetic wave reflective array.

In the implementation, each set of vibration information in the at least one set of vibration information comprises: multiple pieces of first sub vibration information respectively corresponding to the multiple first reflective units of the corresponding electromagnetic wave reflective array.

Figure 3A:
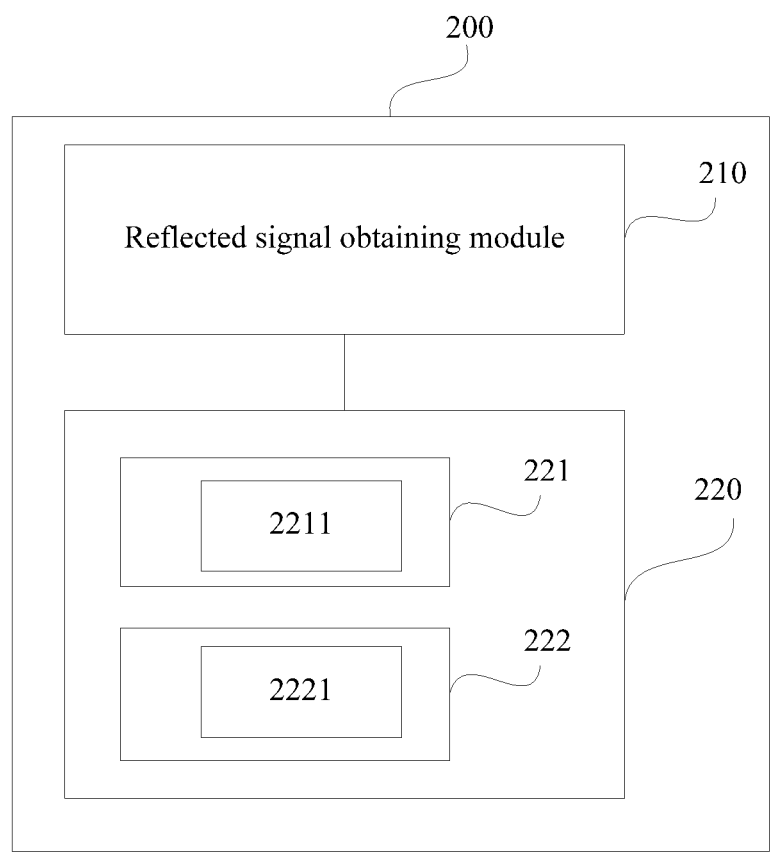
FIG. 3a to FIG. 3c, FIG. 3f, and FIG. 3g are respectively schematic structural block diagrams of an apparatus for obtaining vibration information, according to an embodiment of the present application.

As shown in FIG. 3a, in the implementation, the vibration information obtaining unit 221 comprises:

a first vibration information obtaining subunit 2211, configured to analyze the multiple first reflected electromagnetic wave sub-signals comprised in each group of reflected electromagnetic wave signals to obtain the multiple pieces of first sub vibration information corresponding to the multiple first reflective units of the corresponding electromagnetic wave reflective array.

As shown in FIG. 3a, in the implementation, the vibration direction obtaining unit 222 comprises:

a vibration direction obtaining subunit 2221, configured to obtain, according to amplitudes and phases of the multiple pieces of first sub vibration information comprised in each set of vibration information, a piece of vibration source direction information of the at least one piece of vibration source direction information corresponding to a location of the corresponding electromagnetic wave reflective array.

It can be seen from the foregoing description that, by using the foregoing implementation in the embodiment of the present application, the vibration information and the vibration source direction information of the sound at the at least one electromagnetic wave reflective array in the environment can be restored, that is, obtaining sound information in an environment by using a wireless electromagnetic wave is especially applicable to some scenarios where an active component is not suitable for use at a sound collecting location and a scenario where sound information at multiple locations needs to be collected in a space.

Modules and units of the embodiment of the present application are further described by using the following implementations.

Figure 3B:
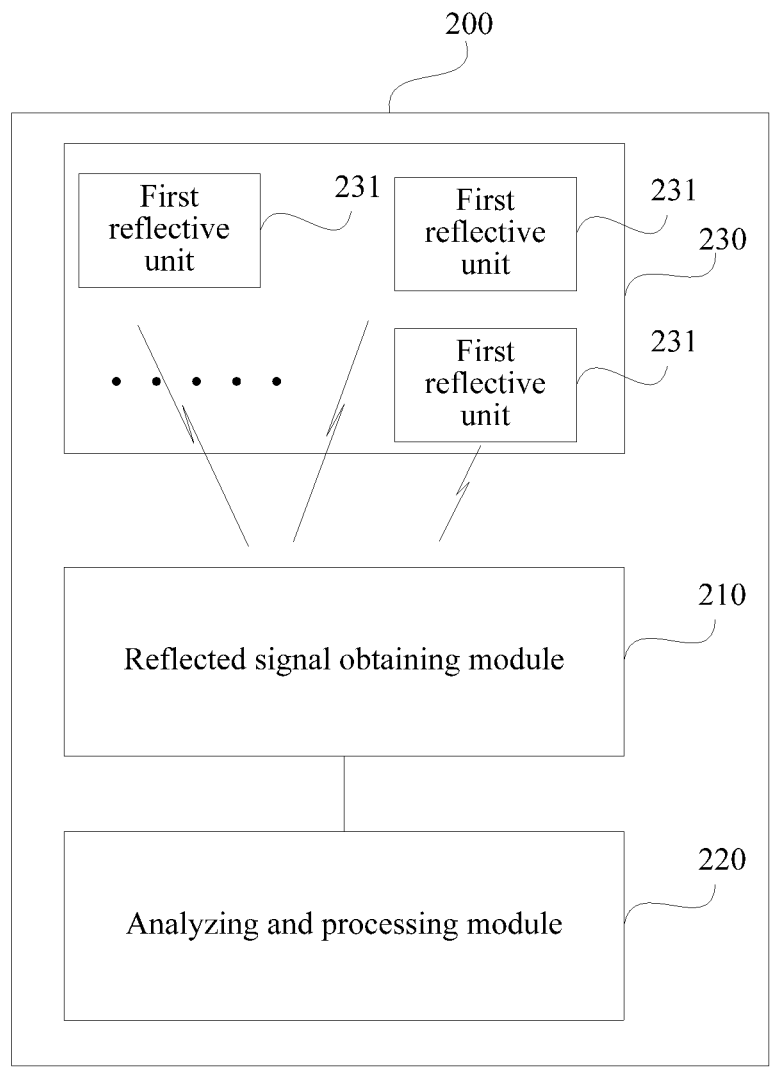

As shown in FIG. 3b, in a possible implementation, the apparatus 200 further comprises:

the at least one electromagnetic wave reflective array 230 (only one electromagnetic wave reflective array 230 is shown in FIG. 3b), configured to, when vibrating in response to the sound in the environment, reflect the electromagnetic wave signal to form the at least one group of reflected electromagnetic wave signals.

In the implementation of the present application, in one aspect, the multiple first reflective units 231 in the at least one electromagnetic wave reflective array 230 can vibrate in response to the sound in the environment, and in another aspect, the multiple first reflective units 231 in the at least one electromagnetic wave reflective array 230 can reflect the electromagnetic wave signal. Electromagnetic wave reflective surfaces of the multiple first reflective units can reflect the electromagnetic wave signal while vibrating, and because the sound causes a mechanical vibration of the electromagnetic wave reflective surface, according to the Doppler's principle, the vibration changes a spectrum characteristic of the reflected electromagnetic wave signal, so that a signal with a frequency modulation characteristic is formed.

In a possible implementation, in an application scenario where sounds need to be collected, the electromagnetic wave reflective array 230 can be set at a location where sounds need to be collected to reflect the electromagnetic wave signal.

In a possible implementation, for example, the at least one electromagnetic wave reflective array 230 can be an electromagnetic wave reflective film array comprising multiple electromagnetic wave reflective films, that is, each electromagnetic wave reflective film is a reflective unit of the electromagnetic wave reflective array (the reflective unit can be the first reflective unit or the second reflective unit described below).

In a possible implementation, in order to obtain corresponding different electromagnetic wave reflective characteristics, printed antennas are also disposed on the multiple electromagnetic wave reflective films.

In a possible implementation, the electromagnetic wave reflective film can be a metallic film for example. In other possible implementations, the electromagnetic wave reflective film can be a film of another material, and the printed antenna is disposed on the reflective surface.

In a possible implementation, the reflecting comprises directional reflecting. That is, directional reflecting the at least one group of reflected electromagnetic wave signals to a location where a receiving end (for example, the signal receiving unit 211 described below) of the at least one group of reflected electromagnetic wave signals is located.

In a possible implementation, the directional reflecting can be implemented by using a shape of each reflective unit in the electromagnetic wave reflective array. For example, in a possible implementation, the electromagnetic wave reflective array 230 comprises multiple electromagnetic wave reflective films with reflective surfaces having curved surfaces, and the receiving end of the at least one group of reflected electromagnetic wave signals is located at a reflection convergence region of the curved surface. In a possible implementation, the curved surface can be a paraboloidal or ellipsoidal surface.

In a possible implementation, the electromagnetic wave signal comprises an environmental electromagnetic wave signal such as a radio wave, an optical signal, and the like in an environment. That is, in the implementation, there is no need to emit another electromagnetic wave signal for reflecting, and the reflected electromagnetic wave signal can be formed by reflecting the existing environmental electromagnetic wave signal in the environment. A person skilled in the art can see that, in the implementation, existing electromagnetic field information in the space can be reused and there is no need to emit an electromagnetic signal.

In another possible implementation, the electromagnetic wave signal comprises a modulated electromagnetic wave signal modulated by an orbital angular momentum.

Figure 3C:
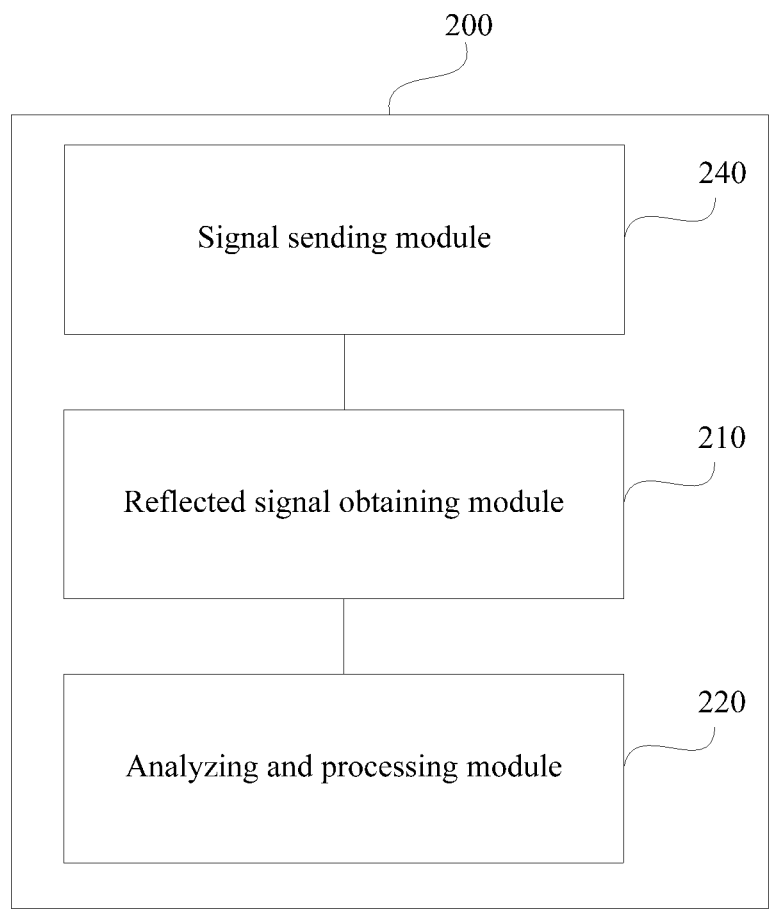

As shown in FIG. 3c, in a possible implementation, the apparatus 200 further comprises:

a signal sending module 240, configured to send the modulated electromagnetic wave signal;

wherein the at least one group of reflected electromagnetic wave signals are conjugated with the modulated electromagnetic wave signal.

In the implementation, by using a characteristic of the modulated electromagnetic wave signal (after a reflection, the angular momentum of the modulated electromagnetic wave signal changes), interference brought by a source signal sent by the signal sending module 240 can be avoided. For details, refer to the corresponding description in the embodiment shown in FIG. 1.

Figure 3D:
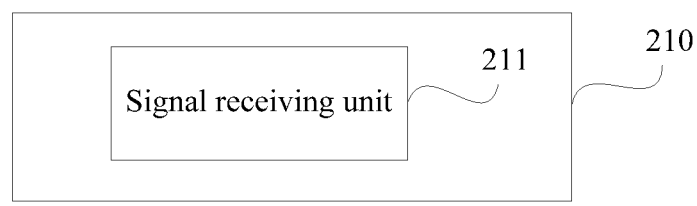
FIG. 3d and FIG. 3e are schematic structural block diagrams of a reflected signal obtaining module of an apparatus for obtaining vibration information, according to an embodiment of the present application.

As shown in FIG. 3d, in a possible implementation, the reflected signal obtaining module 210 comprises:

a signal receiving unit 211, configured to receive the at least one group of reflected electromagnetic wave signals.

Figure 3E:
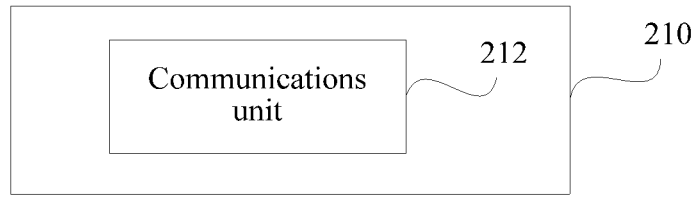

As shown in FIG. 3e, in another possible implementation, the reflected signal obtaining module 210 comprises:

a communications unit 212, configured to obtain the at least one group of reflected electromagnetic wave signals from an external device (for example, the signal receiving unit 211 described above).

In a possible implementation, the analyzing and processing module 220 can restore, by using a change of spectrum distribution of the at least one group of reflected electromagnetic wave signals, the vibration information of the at least one electromagnetic wave reflective array by utilizing a classic frequency modulation and demodulation method or a machine learning method.

Figure 3F:
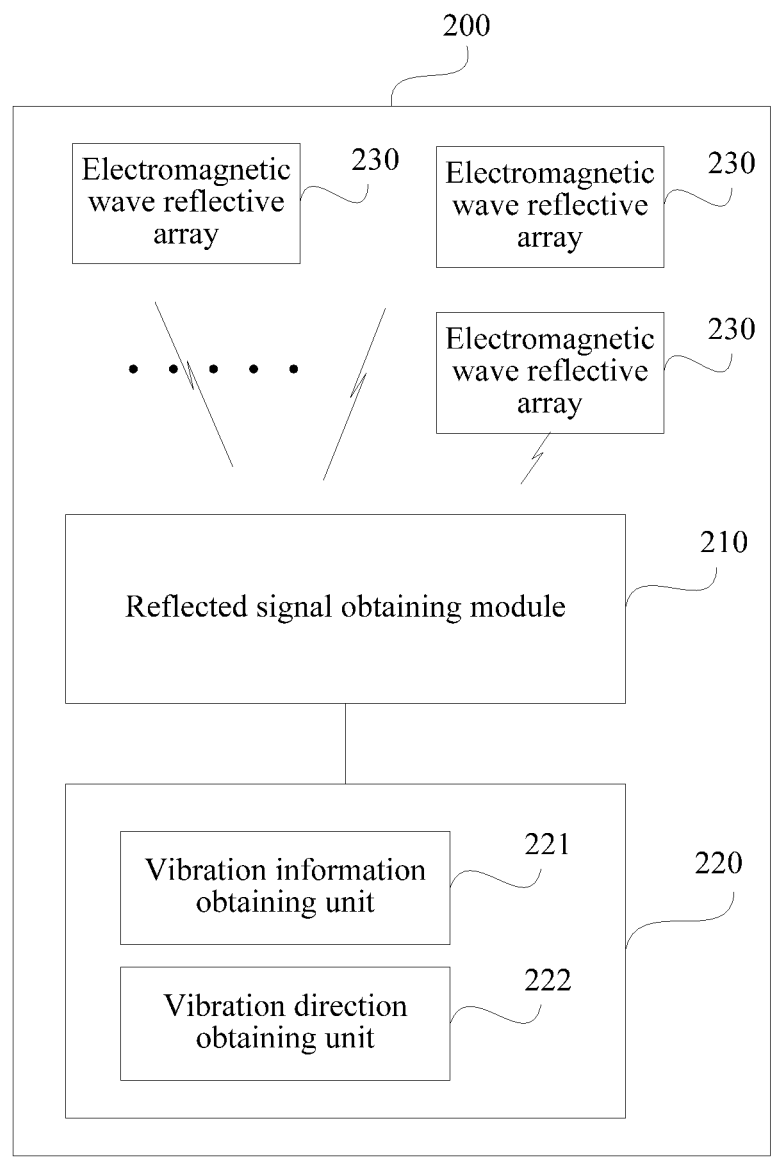

As shown in FIG. 3f, in a possible implementation, the at least one electromagnetic wave reflective array 230 is multiple electromagnetic wave reflective arrays 230.

The signal receiving unit 211 can be configured to receive multiple groups of reflected electromagnetic wave signals reflected by the multiple electromagnetic wave reflective arrays 230.

In order to obtain vibration information of different locations by using the signal receiving unit 211, in a possible implementation, electromagnetic wave reflective characteristics of the multiple electromagnetic wave reflective arrays 230 are different and correspond to multiple different locations. In a possible implementation, the different electromagnetic wave reflective characteristics can be obtained by using patterns of the printed antenna described above.

Here, after the multiple groups of reflected electromagnetic wave signals are obtained, the electromagnetic wave reflective arrays respectively corresponding to the multiple groups of reflected electromagnetic wave signals can be determined according to spectrum locations of the multiple groups of reflected electromagnetic wave signals and the electromagnetic wave reflective characteristics respectively corresponding to the multiple electromagnetic wave reflective arrays, so that vibration information and vibration source direction information of a location where each electromagnetic wave reflective array is located can be obtained.

In the implementation, the vibration information obtaining unit 221 is further configured to:

analyze the multiple groups of reflected electromagnetic wave signals to obtain multiple sets of vibration information corresponding to the multiple locations.

In the implementation, based on different electromagnetic wave reflective characteristics, it is determined that, according to spectrum characteristics of the multiple received groups of reflected electromagnetic wave signals, each group of reflected electromagnetic wave signals are reflected by which electromagnetic wave reflective array 230. In addition, because the location of each electromagnetic wave reflective array 230 is known, the vibration information of the multiple locations can be obtained, and then sounds at the multiple locations are obtained.

In the implementation, the vibration direction obtaining unit 222 is further configured to:

obtain, according to the multiple sets of vibration information, multiple pieces of vibration source direction information one-to-one corresponding to the multiple locations.

Figure 3G:
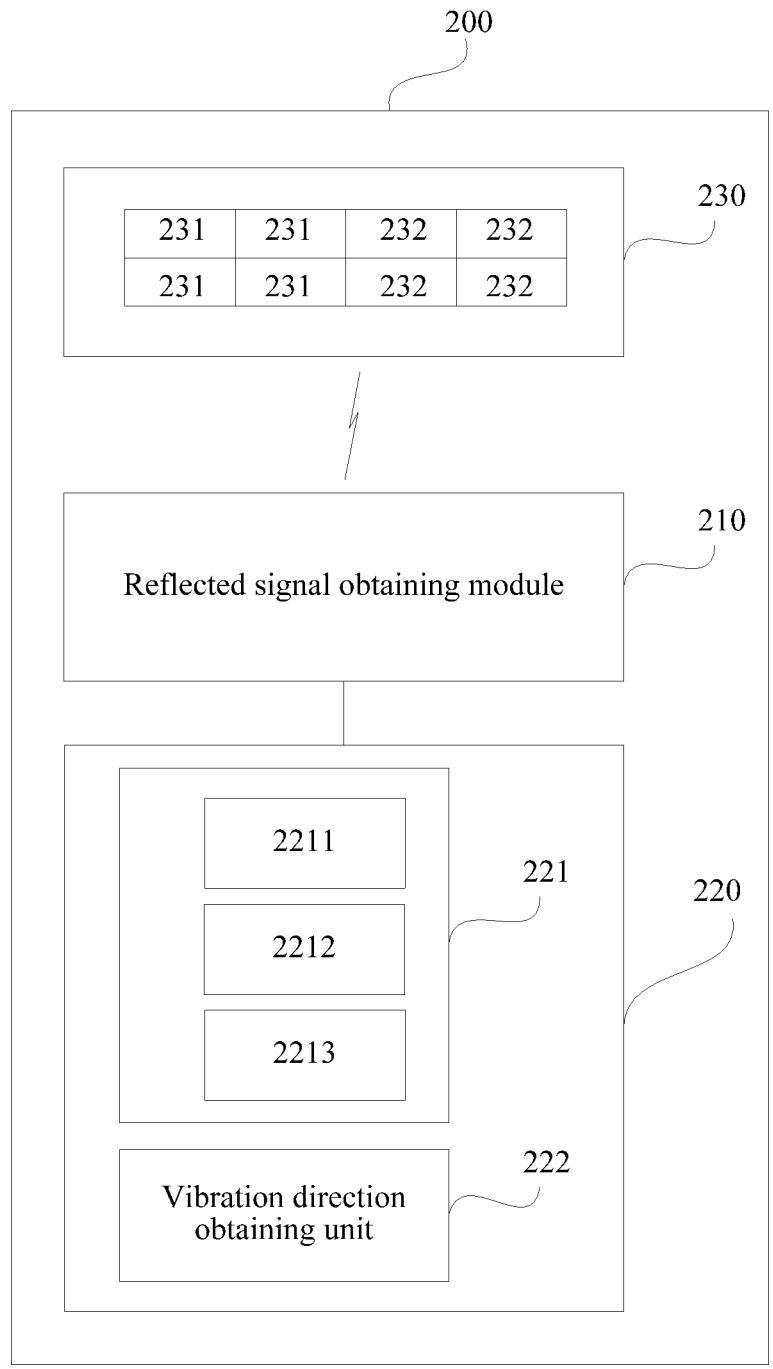

As shown in FIG. 3g, in a possible implementation, besides the multiple first reflective units 231 described above, each electromagnetic wave reflective array in the at least one electromagnetic wave reflective array 230 further comprises multiple second reflective units 232 with different vibration response characteristics.

Each group of reflected electromagnetic wave signals in the at least one group of reflected electromagnetic wave signals comprise multiple second reflected electromagnetic wave sub-signals corresponding to the multiple second reflective units 232 of a corresponding electromagnetic wave reflective array 230 in the at least one electromagnetic wave reflective array.

In the implementation, each set of vibration information comprises multiple pieces of second sub vibration information corresponding to the multiple second reflective units 232 of the corresponding electromagnetic wave reflective array 230.

As shown in FIG. 3g, in the implementation, the vibration information obtaining unit 221 further comprises:

a second vibration information obtaining subunit 2212, configured to analyze the multiple second reflected electromagnetic wave sub-signals comprised in each group of reflected electromagnetic wave signals to obtain the multiple pieces of second sub vibration information.

In a possible implementation, for example, when the multiple second reflective units 232 respectively correspond to sounds within multiple different spectrum ranges, the multiple pieces of second sub vibration information respectively correspond to components within different frequency ranges of the sound in the environment.

As shown in FIG. 3g, in a possible implementation, the vibration information obtaining unit 221 further comprises:

a vibration information synthesizing subunit 2213, configured to synthesize the multiple pieces of second sub vibration information comprised in each set of vibration information to obtain synthesized vibration information of the sound located at each electromagnetic wave reflective array.

By using the implementation, the sound in the environment can be restored more completely in a wider frequency range, which results in better effect of the restored sound.

For further function implementations of modules and units of the apparatus 200 of the embodiment of the present application, refer to the corresponding descriptions in the embodiment shown in FIG. 1, which are not described again herein.

Figure 4:
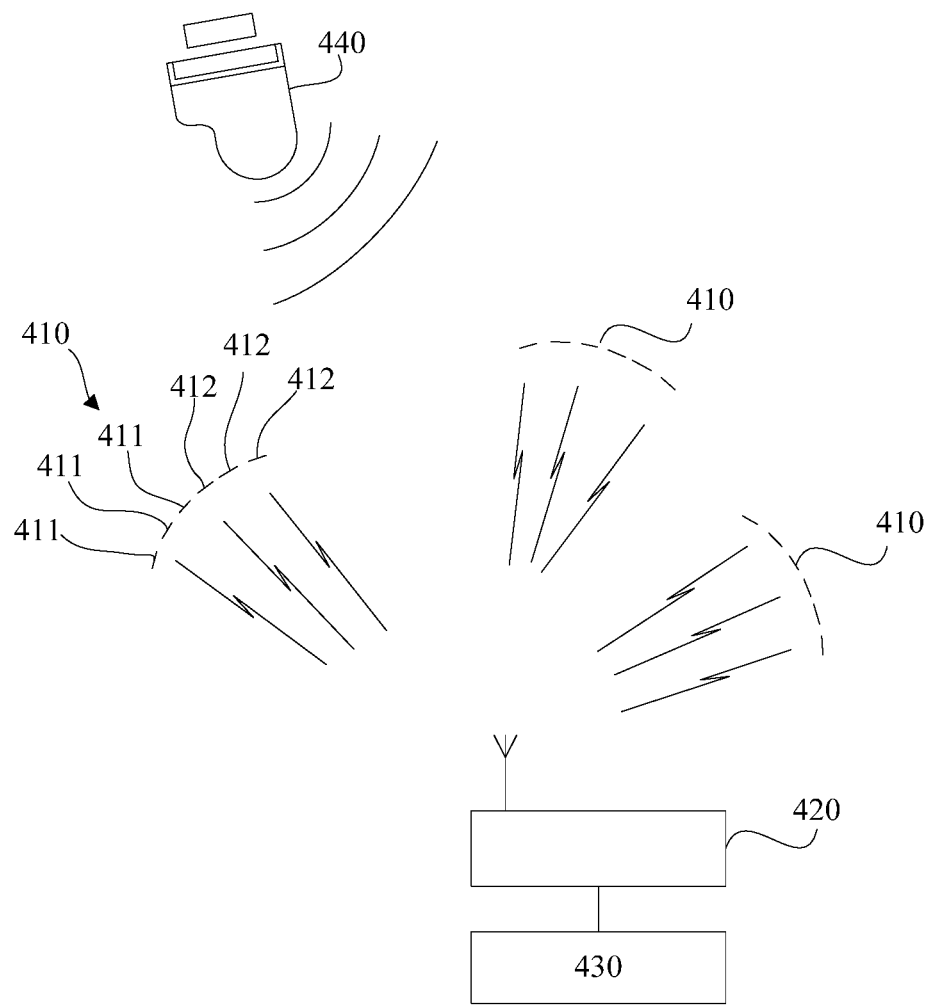
FIG. 4 is a schematic diagram of an application scenario of an apparatus for obtaining vibration information, according to an embodiment of the present application.

FIG. 4 shows a schematic diagram of an application scenario of contactless sound collection of sounds came from a musical instrument 440 according to an embodiment of the present application.

In the implementation, an apparatus according to the embodiment of the present application comprises:

multiple electromagnetic wave reflective arrays 410, wherein each electromagnetic wave reflective array 410 comprises multiple first reflective units 411 with different electromagnetic wave reflective characteristics and multiple second reflective units 412 with different vibration response characteristics;

a reflected signal obtaining module 420, configured to receive multiple groups of reflected electromagnetic wave signals reflected by the multiple electromagnetic wave reflective arrays 410, wherein each group of reflected electromagnetic wave signals comprise multiple first reflected electromagnetic wave sub-signals corresponding to the multiple first reflective units 411 and multiple second reflected electromagnetic wave sub-signals corresponding to the multiple second reflective units 412; and an analyzing and processing module 430, configured to analyze and process the multiple groups of reflected electromagnetic wave signals to obtain synthesized vibration information and vibration source direction information corresponding to a location of each electromagnetic wave reflective array 410.

It can be seen from FIG. 4 that, a sound came from the musical instrument 440 makes each first reflective unit 411 and each second reflective unit 412 of the multiple electromagnetic wave reflective arrays 410 vibrate, and each first reflective unit 411 and each second reflective unit 412 of the multiple electromagnetic wave reflective arrays 410 directionally reflect the corresponding first reflected electromagnetic wave sub-signal and second reflected electromagnetic wave sub-signal to the reflected signal obtaining module 420 while vibrating, so as to form the multiple groups of reflected electromagnetic wave signals. After the reflected signal obtaining module 420 obtains the multiple groups of reflected electromagnetic wave signals, the analyzing and processing module 430 analyzes and processes the multiple groups of reflected electromagnetic wave signals, and then obtains vibration information and vibration source direction information corresponding to a location of each electromagnetic wave reflective array 410.

By using the implementation, vibration information and vibration source direction information of a sound within a wider frequency range can be obtained at multiple locations.

Figure 5:
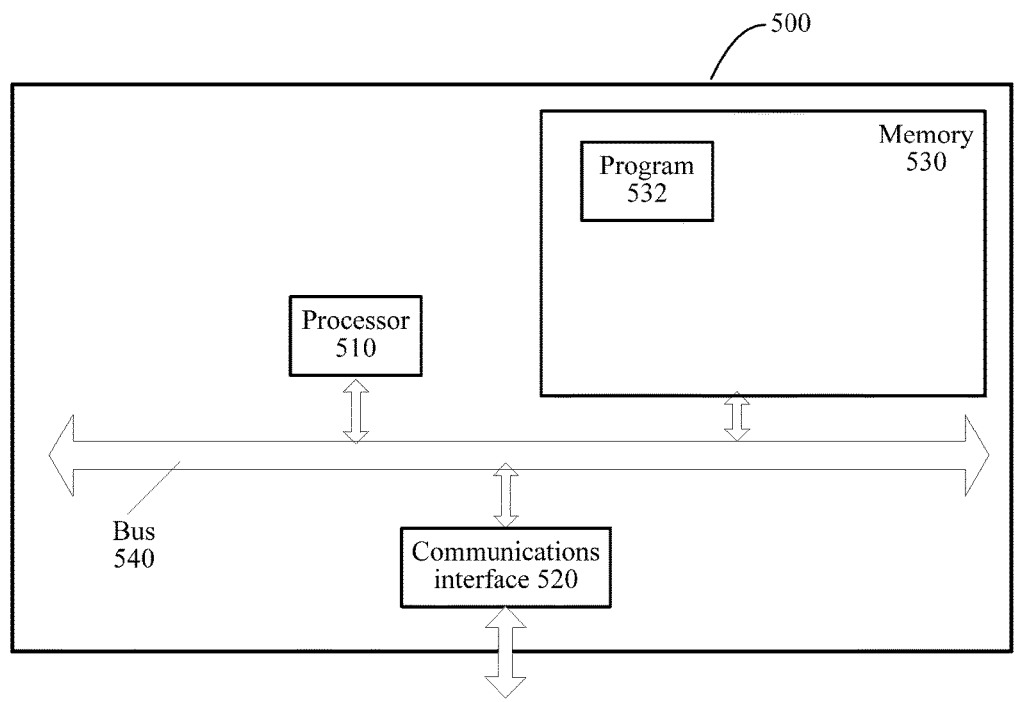
FIG. 5 is a schematic structural block diagram of an apparatus for obtaining vibration information, according to an embodiment of the present application.

FIG. 5 is a schematic structural diagram of another apparatus 500 for obtaining vibration information according to an embodiment of the present application. Specific embodiments of the present application are not intended to limit the specific implementation of the apparatus 500 for obtaining vibration information. As shown in FIG. 5, the apparatus 500 for obtaining vibration information can comprise:

a processor 510, a communications interface 520, a memory 530, and a communications bus 540.

The processor 510, the communications interface 520, and the memory 530 communicate with each other by using the communications bus 540.

The communications interface 520 is configured to communicate with a network element such as a client.

The processor 510 is configured to execute a program 532. Specifically, the processor 510 can perform relevant steps in the foregoing method embodiment.

Specifically, the program 532 can comprise program code, wherein the program code comprises a computer operation instruction.

The processor 510 can be a central processing unit (CPU), an application specific integrated circuit (ASIC), or one or more integrated circuits configured to implement the embodiments of the present application.

The memory 530 is configured to store the program 532. The memory 530 can include a high-speed RAM memory, or can further include a non-volatile memory, for example, at least one disk memory. The program 532 can be specifically used to cause the apparatus 500 for obtaining vibration information to perform the following steps:

obtain at least one group of reflected electromagnetic wave signals, wherein the at least one group of reflected electromagnetic wave signals are formed by reflecting an electromagnetic wave signal by at least one electromagnetic wave reflective array when the at least one electromagnetic wave reflective array vibrates in response to a sound in an environment; and each electromagnetic wave reflective array in the at least one electromagnetic wave reflective array comprises multiple first reflective units with different electromagnetic wave reflective characteristics;

analyze the at least one group of reflected electromagnetic wave signals to obtain at least one set of vibration information corresponding to the at least one electromagnetic wave reflective array; and obtain, according to the at least one set of vibration information, at least one piece of vibration source direction information corresponding to at least one location of the at least one electromagnetic wave reflective array.

For specific implementations of the steps in the program 532, refer to the corresponding descriptions of corresponding steps and units in the foregoing embodiments, which are not described herein again. It can be clearly understood by a person skilled in the art that, for the purpose of convenient and brief description, for detailed working procedures of the foregoing devices and modules, reference can be made to the description of corresponding procedures in the foregoing method embodiments, and details are not described herein again.

Figure 6:
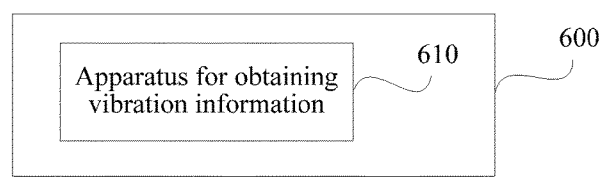
FIG. 6 is a schematic structural block diagram of user equipment, according to an embodiment of the present application.

As shown in FIG. 6, a possible implementation of an embodiment of the present application further provides user equipment 600, which comprises the apparatus 610 for obtaining vibration information described in the embodiments shown in FIG. 2, FIG. 3a to FIG. 3g, FIG. 4 or FIG. 5.

The user equipment 600 includes, but is not limited to, a smart phone, a computer, a tablet, a home gateway, and the like.

In at least one implementation solution of the embodiments of the present application, the vibration information and the vibration source direction information of the sound at the at least one electromagnetic wave reflective array in the environment can be restored, that is, obtaining sound information in an environment by using a wireless electromagnetic wave is especially applicable to some scenarios where an active component is not suitable for use at a sound collecting location and a scenario where sound information at multiple locations needs to be collected in a space.

A person of ordinary skill in the art may be aware that, in combination with the examples described in the embodiments disclosed in this specification, units and method steps may be implemented by electronic hardware or a combination of computer software and electronic hardware. Whether these functions are executed as hardware or software depends upon the particular application and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiment of the present application. The foregoing storage medium includes: any medium that can store program code, such as a USB flash drive, a removable hard disk, a read-only memory (ROM), a random access memory (RAM), a magnetic disk, or an optical disc.

The above implementations are only used to describe the present application, rather than limit the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. A method for obtaining vibration information, comprising:
  obtaining at least one group of reflected electromagnetic wave signals, wherein the at least one group of reflected electromagnetic wave signals are formed by reflecting an electromagnetic wave signal by at least one electromagnetic wave reflective array when the at least one electromagnetic wave reflective array vibrates in response to a sound in an environment, and each electromagnetic wave reflective array in the at least one electromagnetic wave reflective array comprises multiple first reflective units with different electromagnetic wave reflective characteristics;
  analyzing the at least one group of reflected electromagnetic wave signals to obtain at least one set of vibration information corresponding to the at least one electromagnetic wave reflective array; and
  obtaining, according to the at least one set of vibration information, at least one piece of vibration source direction information corresponding to at least one location of the at least one electromagnetic wave reflective array.

2. The method of claim 1, wherein each group of reflected electromagnetic wave signals in the at least one group of reflected electromagnetic wave signals comprise multiple first reflected electromagnetic wave sub-signals corresponding to the multiple first reflective units of a corresponding electromagnetic wave reflective array in the at least one electromagnetic wave reflective array.

3. The method of claim 2, wherein each set of vibration information in the at least one set of vibration information comprises:
  multiple pieces of first sub vibration information respectively corresponding to the multiple first reflective units of the corresponding electromagnetic wave reflective array; and
  wherein the analyzing the at least one group of reflected electromagnetic wave signals to obtain at least one set of vibration information comprises:
  analyzing the multiple first reflected electromagnetic wave sub-signals comprised in each group of reflected electromagnetic wave signals to obtain the multiple pieces of first sub vibration information corresponding to the multiple first reflective units of the corresponding electromagnetic wave reflective array.

4. The method of claim 3, wherein the obtaining, according to the at least one set of vibration information, at least one piece of vibration source direction information corresponding to the at least one location of the at least one electromagnetic wave reflective array comprises:
  obtaining, according to amplitudes and phases of the multiple pieces of first sub vibration information comprised in each set of vibration information, a piece of vibration source direction information of the at least one piece of vibration source direction information corresponding to a location of the corresponding electromagnetic wave reflective array.

5. The method of claim 1, wherein the reflecting comprises directional reflecting.

6. The method of claim 1, wherein
  the at least one electromagnetic wave reflective array comprises multiple electromagnetic wave reflective arrays with different electromagnetic wave reflective characteristics; and
  the at least one group of reflected electromagnetic wave signals comprise multiple groups of reflected electromagnetic wave signals corresponding to the multiple electromagnetic wave reflective arrays,
  the multiple electromagnetic wave reflective arrays corresponding to multiple locations.

7. The method of claim 1 or 6, wherein each electromagnetic wave reflective array in the at least one electromagnetic wave reflective array comprises multiple second reflective units with different vibration response characteristics; and
  each group of reflected electromagnetic wave signals in the at least one group of reflected electromagnetic wave signals comprise multiple second reflected electromagnetic wave sub-signals corresponding to the multiple second reflective units of a corresponding electromagnetic wave reflective array in the at least one electromagnetic wave reflective array.

8. The method of claim 7, wherein
  each set of vibration information comprises multiple pieces of second sub vibration information corresponding to the multiple second reflective units of the corresponding electromagnetic wave reflective array; and
  the analyzing the at least one group of reflected electromagnetic wave signals to obtain at least one set of vibration information comprises:
  analyzing the multiple second reflected electromagnetic wave sub-signals comprised in each group of reflected electromagnetic wave signals to obtain the multiple pieces of second sub vibration information.

9. The method of claim 8, wherein the method further comprises:
  synthesizing the multiple pieces of second sub vibration information comprised in each set of vibration information to obtain synthesized vibration information of the sound located at each electromagnetic wave reflective array.

10. The method of claim 1, wherein the electromagnetic wave signal comprises an environmental electromagnetic wave signal.

11. The method of claim 1, wherein the electromagnetic wave signal comprises:
a modulated electromagnetic wave signal modulated by an orbital angular momentum, each group of reflected electromagnetic wave signals of the at least one group of reflected electromagnetic wave signals is conjugated with the modulated electromagnetic wave signal.

12. The method of claim 1, further comprising:
forming, when the at least one electromagnetic wave reflective array vibrates in response to the sound in the environment, the at least one group of reflected electromagnetic wave signals by reflecting the electromagnetic wave signal by the at least one electromagnetic wave reflective array.

13. An apparatus for obtaining vibration information, comprising:
a reflected signal obtaining module, configured to obtain at least one group of reflected electromagnetic wave signals, wherein the at least one group of reflected electromagnetic wave signals are formed by reflecting an electromagnetic wave signal by at least one electromagnetic wave reflective array when the at least one electromagnetic wave reflective array vibrates in response to a sound in an environment, and each electromagnetic wave reflective array in the at least one electromagnetic wave reflective array comprises multiple first reflective units with different electromagnetic wave reflective characteristics; and
an analyzing and processing module, comprising:
a vibration information obtaining unit, configured to analyze the at least one group of reflected electromagnetic wave signals to obtain at least one set of vibration information corresponding to the at least one electromagnetic wave reflective array; and
a vibration direction obtaining unit, configured to obtain, according to the at least one set of vibration information, at least one piece of vibration source direction information corresponding to at least one location of the at least one electromagnetic wave reflective array.

14. The apparatus of claim 13, wherein each group of reflected electromagnetic wave signals in the at least one group of reflected electromagnetic wave signals comprise multiple first reflected electromagnetic wave sub-signals corresponding to the multiple first reflective units of a corresponding electromagnetic wave reflective array in the at least one electromagnetic wave reflective array.

15. The apparatus of claim 14, wherein each set of vibration information in the at least one set of vibration information comprises: multiple pieces of first sub vibration information respectively corresponding to the multiple first reflective units of the corresponding electromagnetic wave reflective array; and
the vibration information obtaining unit comprises:
a first vibration information obtaining subunit, configured to analyze the multiple first reflected electromagnetic wave sub-signals comprised in each group of reflected electromagnetic wave signals to obtain the multiple pieces of first sub vibration information corresponding to the multiple first reflective units of the corresponding electromagnetic wave reflective array.

16. The apparatus of claim 15, wherein the vibration direction obtaining unit comprises:
a vibration direction obtaining subunit, configured to obtain, according to amplitudes and phases of the multiple pieces of first sub vibration information comprised in each set of vibration information, a piece of vibration source direction information of the at least one piece of vibration source direction information corresponding to a location of the corresponding electromagnetic wave reflective array.

17. The apparatus of claim 13, wherein the reflected signal obtaining module is further configured to:
obtain multiple groups of reflected electromagnetic wave signals corresponding to multiple electromagnetic wave reflective arrays with different electromagnetic wave reflective characteristics; and
the at least one group of reflected electromagnetic wave signals comprise multiple groups of reflected electromagnetic wave signals corresponding to the multiple electromagnetic wave reflective arrays,
the multiple electromagnetic wave reflective arrays corresponding to multiple locations.

18. The apparatus of claim 13, wherein each electromagnetic wave reflective array in the at least one electromagnetic wave reflective array comprises multiple second reflective units with different vibration response characteristics; and
each group of reflected electromagnetic wave signals in the at least one group of reflected electromagnetic wave signals comprise multiple second reflected electromagnetic wave sub-signals corresponding to the multiple second reflective units of a corresponding electromagnetic wave reflective array in the at least one electromagnetic wave reflective array.

19. The apparatus of claim 18, wherein
each set of vibration information comprises multiple pieces of second sub vibration information corresponding to the multiple second reflective units of the corresponding electromagnetic wave reflective array; and
the vibration information obtaining unit further comprises:
a second vibration information obtaining subunit, configured to analyze the multiple second reflected electromagnetic wave sub-signals comprised in each group of reflected electromagnetic wave signals to obtain the multiple pieces of second sub vibration information.

20. The apparatus of claim 19, wherein the vibration information obtaining unit further comprises:
a vibration information synthesizing subunit, configured to synthesize the multiple pieces of second sub vibration information comprised in each set of vibration information to obtain synthesized vibration information of the sound located at each electromagnetic wave reflective array.

21. The apparatus of claim 13, wherein the electromagnetic wave signal comprises an environmental electromagnetic wave signal.

22. The apparatus of claim 13, wherein the electromagnetic wave signal comprises:
a modulated electromagnetic wave signal modulated by an orbital angular momentum; and
wherein the apparatus further comprises:
a signal sending module, configured to send the modulated electromagnetic wave signal;
wherein each group of reflected electromagnetic wave signals of the at least one group of reflected electromagnetic wave signals is conjugated with the modulated electromagnetic wave signal.

23. The apparatus of claim 13, further comprising:
the at least one electromagnetic wave reflective array, configured to, when vibrating in response to the sound in the environment, reflect the electromagnetic wave signal to form the at least one group of reflected electromagnetic wave signals.

24. The apparatus of claim 23, wherein the at least one electromagnetic wave reflective array is further configured to, when vibrating in response to the sound in the environment, directionally reflect the electromagnetic wave signal to form the at least one group of reflected electromagnetic wave signals.

25. A user apparatus, comprising the apparatus for obtaining vibration information of claim 13.

26. A computer readable storage device comprising executable instructions that, in response to execution, cause a device comprising a processor to perform operations, comprising:

obtaining at least one group of reflected electromagnetic wave signals, wherein the at least one group of reflected electromagnetic wave signals are formed by reflecting an electromagnetic wave signal by at least one electromagnetic wave reflective array when the at least one electromagnetic wave reflective array vibrates in response to a sound in an environment, and each electromagnetic wave reflective array in the at least one electromagnetic wave reflective array comprises multiple first reflective units with different electromagnetic wave reflective characteristics;

analyzing the at least one group of reflected electromagnetic wave signals to obtain at least one set of vibration information corresponding to the at least one electromagnetic wave reflective array; and obtaining, according to the at least one set of vibration information, at least one piece of vibration source direction information corresponding to at least one location of the at least one electromagnetic wave reflective array.

\* \* \* \* \*

UNITED STATES PATENT AND TRADEMARK OFFICE
CERTIFICATE OF CORRECTION

PATENT NO. : 10,338,218 B2
APPLICATION NO. : 15/526239
DATED : July 2, 2019
INVENTOR(S) : Lin Du Page 1 of 1

It is certified that error appears in the above-identified patent and that said Letters Patent is hereby corrected as shown below:

In the Claims

Claim 7, Column 16, Line 40:
"claim 1 or 6" should read -- claim 1 --.

Signed and Sealed this
Fifth Day of November, 2019

Andrei Iancu
*Director of the United States Patent and Trademark Office*